March 12, 1963     S. M. LINDBLAD     3,080,634
ATTACHMENTS FOR AUTOMOBILE SAFETY BELTS
Filed Sept. 27, 1960
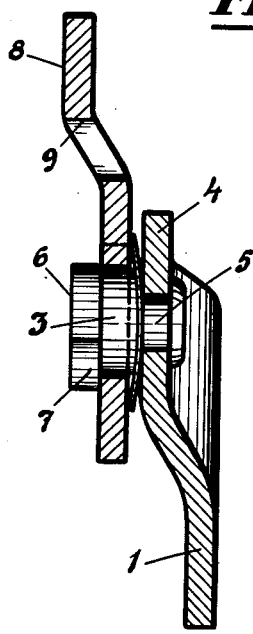
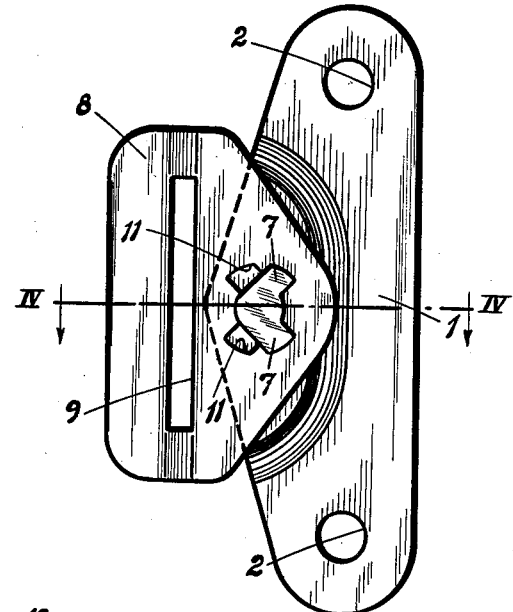
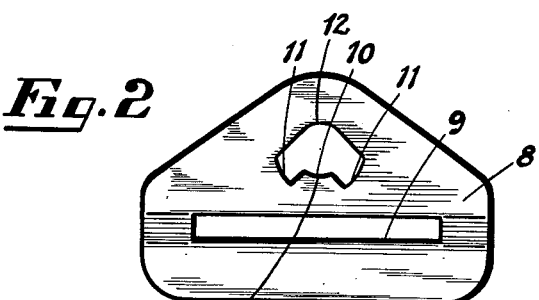
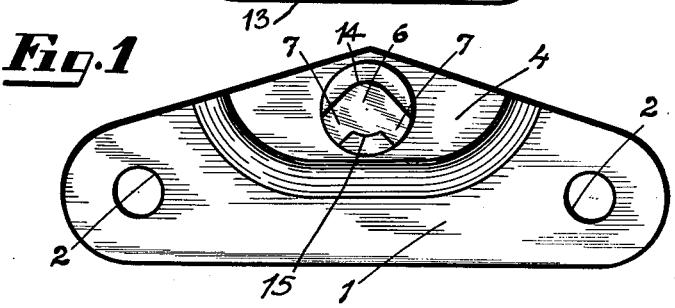
INVENTOR
STIG MARTIN LINDBLAD 元
United States Patent Office 3,080,634
Patented Mar. 12, 1963

3,080,634
ATTACHMENTS FOR AUTOMOBILE
SAFETY BELTS
Stig Martin Lindblad, Vargarda, Sweden
Filed Sept. 27, 1960, Ser. No. 58,788
Claims priority, application Sweden Sept. 29, 1959
2 Claims. (Cl. 24—221)

The present invention relates to attachments for automobile safety belts.

Earlier such attachments have been made in the form of brackets secured to the ends of the belts and bolted into place in the car body. A safety belt which is installed in this manner may not readily be removed in case it is desired, for instance, to move the belt to another seat in the car, or if the belt has been in use during an accident or if it has been damaged in some other way and must be replaced.

The invention has for its object to provide a durable and reliable attachment by means of which a safety belt may be rapidly and easily attached and detached and which at the same time offers good safety against unintentional disconnection of the belt.

According to the invention the attachment comprises a first plate adapted to be secured to the car, a second plate adapted to be secured to the safety belt, a pin projecting from one of said plates substantially at right angles thereto and having a head, the other plate being provided with an opening for receiving said pin, the head of said pin and said opening having an out-of-round shape permitting said plates to be interconnected and disconnected only in a certain relative angular position, said plates further being rotatable relative to each other, when interconnected, under friction caused by a spring washer or the like positioned between said plates.

One embodiment of the invention is illustrated in the accompanying drawing wherein:

FIGURE 1 is a side view of the plate to be secured to the car;

FIGURE 2 is a side view of the plate to be secured to the safety belt;

FIGURE 3 shows both plates interconnected, and

FIGURE 4 is a cross section to a larger scale along the line IV—IV in FIGURE 3.

The plate indicated at 1 is provided with holes 2 for bolts or screws by means of which the plate is to be secured at a suitable place in a car. The plate 1 is further provided with a pin 3 projecting therefrom and being secured to a bent-out portion 4 of the plate by riveting of the smaller diameter end portion 5 of the pin. The pin 3 is provided with a head 6 situated a distance above the plate and having substantially radial projections 7. The second plate 8 which is intended to be interconnected with plate 1 is provided with an elongated slot 9 for receiving one part of a safety belt not shown in the drawing, and is further provided with an opening 10 for receiving the pin 3 of the plate 1 when the two plates are interconnected. The opening 10 is formed with arcuate portions 12 and 13 connecting lateral notches 11 the shape of which corresponds to the shape of the head 6 including the arcuate portions 14 and 15 of said pin and the projections 7 of the head 6 of pin 3.

The out-of-round shape of the head 6 and the opening 10 provided by the projections 7 and the notches 11, respectively, is such that the plate 8 may be placed on the pin 3 only in a certain relative angular position between the plates 1 and 8. After the plate 8 has been placed upon the pin 3 it is rotated relative to the plate 1, for instance to the position shown in FIGURE 3, in which position the projections 7 of the head 6 prevent the plate 8 from being lifted off the pin 3. Also the arcuate portions 12 and 13 of opening 10 mate with pin 3 when said pin extends through said opening tending to prevent the bending of said pin due to any lateral stresses thereon. To prevent the plate 8 from being rotated unintentionally, or under the influence of vibrations and the like, back to that position (180° from the position shown in FIGURE 1) in which the plate 8 may be removed from the plate 1, a spring washer 12 is placed around the pin 3 between the plates and keeps the plate 8 resiliently pressed against the projections on the head 6 of the pin, so that the plate 8 will be rotatable only against the action of the friction provided by the spring washer.

The details of the attachment, for instance the shape of the head 6 and the opening 10, may of course be varied within the scope of the invention which is not limited to the embodiment hereinbefore described and as shown in the accompanying drawing, said embodiment being chosen as an example only. For example, one variation which lies within the scope of the appended claims would be to provide the pin 3 on the plate 8 and, consequently, to provide the opening 10 in the plate 1.

What I claim is:

1. A connector for attaching safety belts to vehicles comprising a first plate adapted to be secured to a vehicle, a second plate adapted to be secured to a safety belt, a cylindrical pin connected to and projecting from one of said plates substantially at right angles thereto, the other of said plates being provided with an opening, said pin having at least two radial projections forming an angle of less than 180° therebetween and spaced from the plate having said pin thereon, said other plate opening being of a configuration corresponding to that of said pin and its projections for receiving said pin and its projections therethrough, said other plate being rotatable around said pin when said pin extends through said other plate opening for moving said other plate opening into and from alignment with said projections and said pin, and a spring washer positioned between said plates tending to move said other plate against said projections, restraining the relative rotation of said plates because of the friction between said other plate and said projections.

2. A connector as claimed in claim 1 wherein said other plate opening configuration is provided by curved portions joining radial notches for the passage of said projections through said radial notches in one position of said plates with said curved portions mating with said pin, so as to tend to prevent the bending of said pin due to any lateral stresses thereon.

References Cited in the file of this patent
UNITED STATES PATENTS

| | | |
|---|---|---|
| 26,508 | Margerum et al. | Dec. 20, 1859 |
| 1,223,683 | Ferguson | Apr. 24, 1917 |
| 2,256,068 | Vöster | Sept. 16, 1941 |
| 2,260,048 | Newell | Oct. 21, 1941 |